US010719429B2

(12) United States Patent
Rahaman (10) Patent No.: US 10,719,429 B2
(45) Date of Patent: Jul. 21, 2020

(54) SYSTEM AND METHOD FOR DYNAMIC LOAD TESTING ON TARGET APPLICATION

(71) Applicant: Tata Consultancy Services Limited, Mumbai (IN)

(72) Inventor: Lutfur Rahaman, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 487 days.

(21) Appl. No.: 15/423,256

(22) Filed: Feb. 2, 2017

(65) Prior Publication Data
US 2018/0095868 A1    Apr. 5, 2018

(30) Foreign Application Priority Data

Sep. 30, 2016 (IN) .............................. 201621033497

(51) Int. Cl.
*G06F 11/36* (2006.01)
*G06F 9/50* (2006.01)
*G06F 9/48* (2006.01)

(52) U.S. Cl.
CPC .......... *G06F 11/3688* (2013.01); *G06F 9/485* (2013.01); *G06F 9/5005* (2013.01); *G06F 11/3664* (2013.01)

(58) Field of Classification Search
CPC ........................ G06F 11/3688; G06F 9/5005
See application file for complete search history.

(56) References Cited

U.S. PATENT DOCUMENTS

| 7,577,734 | B2 | 8/2009 | Kakimoto | |
|---|---|---|---|---|
| 8,850,396 | B2 | 9/2014 | Pasternak | |
| 2002/0124042 | A1* | 9/2002 | Melamed | G01M 15/00 718/102 |
| 2005/0193258 | A1* | 9/2005 | Sutton | G06F 11/3409 714/32 |
| 2007/0083630 | A1 | 4/2007 | Roth et al. | |
| 2014/0068335 | A1* | 3/2014 | Bromley | H04L 43/50 714/32 |
| 2015/0301871 | A1* | 10/2015 | Duvuru | G06F 9/526 718/104 |

OTHER PUBLICATIONS

"Oracle Load Testing", Oracle Data Sheet, Oracle Enterprise Manager, 3 pages (2011).

* cited by examiner

*Primary Examiner* — Yoshihisa Ishizuka
(74) *Attorney, Agent, or Firm* — Finnegan, Henderson, Farabow, Garrett & Dunner LLP (57) ABSTRACT

A system and method for dynamic load testing on a target application are provided. The method includes, receiving a request for varying load on a target application in running load-testing environment. The running load-testing environment has a plurality of threads being executed for load-testing. The plurality of threads has a coordinator thread and one or more waiting threads. Further, the one or more waiting threads are locked from accessing the target application and the coordinator thread capable of unlocking the one or more waiting threads. The coordinator thread is executed based on the request to unlock the one or more waiting threads. The unlocked threads access the target application to test the load.

6 Claims, 8 Drawing Sheets

SYSTEM AND METHOD FOR DYNAMIC LOAD TESTING ON TARGET APPLICATION

PRIORITY CLAIM

This U.S. Patent application claims priority under 35 U.S.C. § 119 to India Application No. 201621033497, filed on Sep. 30, 2016. The entire contents of the aforementioned application are incorporated herein by reference.

TECHNICAL FIELD

The present subject matter relates, in general, to load testing of applications, and, more particularly, to a system and method for dynamic load testing on target applications.

BACKGROUND

With an increasing popularity and complexity of various applications, the task of testing load on the applications has become increasingly challenging. Load testing is a type of performance test to verify a system's stability during bursts of concurrent users and/or system activity to varying degrees of load over varying time periods. For example, stress testing is a form of deliberately intense or thorough testing used to determine the stability of a given system or entity. Stress testing involves testing the application beyond normal operational capacity, often to a breaking point, in order to observe the results. End users are routinely faced with load testing burdensome tasks, including, for example, inability of increasing concurrency level during test execution (i.e., once a test execution is triggered a load testing framework does not provide any external control over further increase in concurrency), analyzing the performance of applications, dynamically changing the load for testing and increase in overall duration of the performance testing. These problems are particularly troublesome for end user to analyze the performance of the application by testing the load dynamically.

Testing of the application leads to the development of performance enabled intelligent applications across diverse domains.

The available load testing frameworks perform complex processing operations at the application to enable load testing by a plurality of loads. However, to perform load testing processing operations, the maximum load to be tested on the target application is pre-determined. Currently, in a typical load testing framework the target concurrent load count along with other test behavioral parameters are provided at a pre execution stage. Once a test execution is triggered the load testing framework does not provide any external control over further increase in concurrency of load, and hence, it leads to a considerable increase in overall duration of the performance testing.

SUMMARY

Embodiments of the present disclosure present technological improvements as solutions to one or more of the above-mentioned technical problems recognized by the inventors in conventional systems. In view of the foregoing, embodiments herein provide a system and method for dynamic load testing on target application.

In view of the foregoing, various embodiments herein provide methods and systems for dynamic concurrency increment in thread based load testing framework. Dynamic loading is a mechanism by which a computer program can, at run time, load the varying load request. In an embodiment, a computer implemented method for dynamic concurrency increment in thread based load testing framework is provided. The method can be executed by a computing device. The method includes, receiving a request for varying load on a target application in a running load-testing environment. The running load-testing environment has a plurality of threads being executed for load-testing. Further, the plurality of threads include a coordinator thread and one or more waiting threads. The one or more waiting threads are locked from accessing the target application and the coordinator thread is capable of unlocking the one or more waiting threads. Furthermore, the method includes, the coordinator thread being executed based on the request to unlock the one or more, waiting threads. Subsequently, the unlocked threads access the target application to test the load. Finally, the method includes, providing the dynamic load testing on the target application.

In another embodiment, computer-implemented system for dynamic load testing on target application is provided. The system includes a memory, and a processor. The memory is coupled to the processor, such that the processor is configured by the said instructions stored in the memory to receive a request for varying load on a target application in running load-testing environment. The running load-testing environment has a plurality of threads being executed for load-testing. Further, the plurality of threads includes a coordinator thread and one or more waiting threads. The one or more waiting threads are locked from accessing the target application and the coordinator thread is capable of unlocking the one or more waiting threads. Furthermore, the coordinator thread is executed based on the request to unlock the one or more waiting threads. Subsequently, the unlocked threads access the target application to test the load. Finally, the method includes, providing the dynamic load testing on the target application.

In yet another embodiment, a non-transitory computer-readable medium having embodied thereon a computer program for executing a method for dynamic concurrency increment in thread based load testing framework is provided. The method includes facilitating, at a computing device, receiving a request for varying load on a target application in running load-testing environment. The running load-testing environment has a plurality of threads being executed for load-testing. Further, the plurality of threads includes a coordinator thread and one or more waiting threads. The one or more waiting threads are locked from accessing the target application and the coordinator thread is capable of unlocking the one or more waiting threads. Furthermore, the coordinator thread is executed based on the request to unlock the one or more waiting threads. Subsequently, the unlocked threads access the target application to test the load. Finally, the method includes, providing the dynamic load testing on the target application.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Unless specifically stated otherwise as apparent from the following discussions, it is to be appreciated that throughout the present disclosure, discussions utilizing terms such as "determining" or "generating" or "comparing" or the like, refer to the action and processes of a computer system, or similar electronic activity detection device, that manipulates and transforms data represented as physical (electronic) quantities within the computer system's registers and memories into other data similarly represented as physical quantities within the computer system memories or registers or other such information storage, transmission or display devices.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The methods and systems are not limited to the specific embodiments described herein. In addition, the method and system can be practiced independently and separately from other modules and methods described herein. Each device element/module and method can be used in combination with other elements/modules and other methods.

Throughout the description and claims of this complete specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes and programs can be stored in a memory and executed by a processing unit.

In another firmware and/or software implementation, the functions may be stored as one or more instructions or code on a non-transitory computer-readable medium. Examples include computer-readable media encoded with a data structure and computer-readable media encoded with a computer program. The computer-readable media may take the form of an article of manufacturer. The computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk, and Blue-ray disc where disks usually reproduce data magnetically, while discs reproduce data optically with lasers. Combinations of the above should also be included within the scope of computer-readable media.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The embodiments herein provide a system and method for dynamic load testing on a target application. The disclosed system enables providing external control to increment a load on a target application in a running load testing environment. Load testing includes applying ordinary stress to a software application or information technology (IT) system to check the performance under normal and peak load conditions. A running load testing environment is a scenario wherein the load testing of a software application is currently being performed. The running load testing environment includes a target application, a plurality of threads and a load increment requester. Herein, incrementing the load refers to the concurrent increase of load on a target application within the running load testing environment. The disclosed method and system are not limited to the cited example scenarios and can be included in a variety of applications and scenarios without departing from the scope of the embodiments. Referring now to the drawings, and more particularly to FIGS. 1 through 4E, where similar reference characters denote corresponding features consistently throughout the figures, there are shown preferred embodiments and these embodiments are described in the context of the following exemplary system and/or method.

The purpose of dynamic load testing is to provide external control over further increase in concurrency of load during load testing and to decrease the overall duration of the performance testing on the target application or application. Herein, the terms target application/application refers to an application that is under testing for determining performance of the application under varying loading conditions, and hence the 'target application' may also be referred to as 'application under test'. It will be noted that the terms application under test and target applications can be used interchangeably throughout the description. The plurality of threads present in the running load testing environment are capable of performing a predefined sequence of steps which constitutes the load generation task. The present system divides the plurality of threads into a coordinator thread and the remaining threads into one or more waiting threads. The plurality of threads act as virtual users which perform a sequence of steps to achieve a business goal. By performing the sequence of steps, the plurality of threads can access different parts or modules of a single target application or different target applications.

Various embodiments disclosed herein provide method and system for dynamic load testing of a target application, thereby achieving decrease in overall duration of the performance testing and providing external control to a user for increase in concurrency during load testing on the target application. A system for dynamic load testing is described further with reference to FIG. 1.

Figure 1:
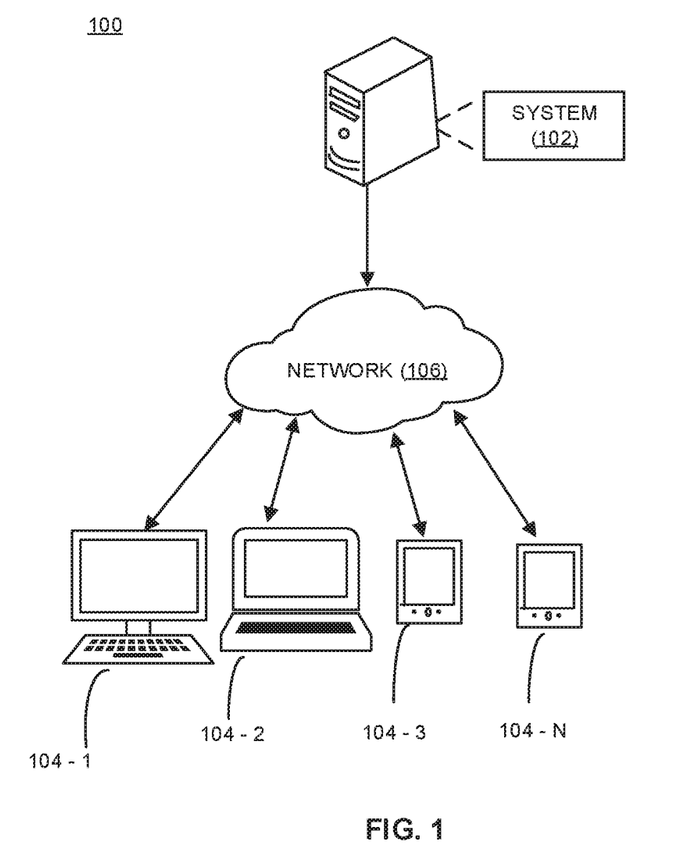
FIG. 1 illustrates a network implementation for dynamic load testing on a target application, according to some embodiments of the present disclosure.

FIG. 1 illustrates a network implementation 100 for dynamic load testing of a target application, according to some embodiments of the present disclosure. The network implementation 100 is shown to include a system 102 which can be implemented in one or more computing devices, such as devices 104-1, 104-2 . . . 104-N, and a communication network 106 for facilitating communication between the system 102 and the devices 104-1, 104-2 . . . 104-N. The system 102 processes a load increment request to increase the number of threads that can be utilized to access the target application for load testing. Herein, it will be understood that the system 102 may also be implemented as a variety of computing platforms. In one implementation, the system 102 may be implemented in a cloud-based environment. Examples of the devices 104 may include, but are not limited to, a portable computer, a personal digital assistant, a handheld device, and a workstation mobile headset, and the like.

In one implementation, the communication network 106 may be a wireless network, a wired network or a combination thereof. The communication network 106 can be implemented as one of the different types of networks, such as intranet, local area network (LAN), wide area network (WAN), the internet, and the like. The communication network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

The disclosed system 102 enables dynamic load testing to decrease the overall duration of the performance testing and increase the efficiency of the load testing system as multiple test executions are not required. Herein, the dynamic load testing refers to increasing the load on the target application concurrently at the time of load testing by unlocking the requested number of threads. The block diagram for the system 102 is described further in detail with reference to FIG. 2.

Figure 2:
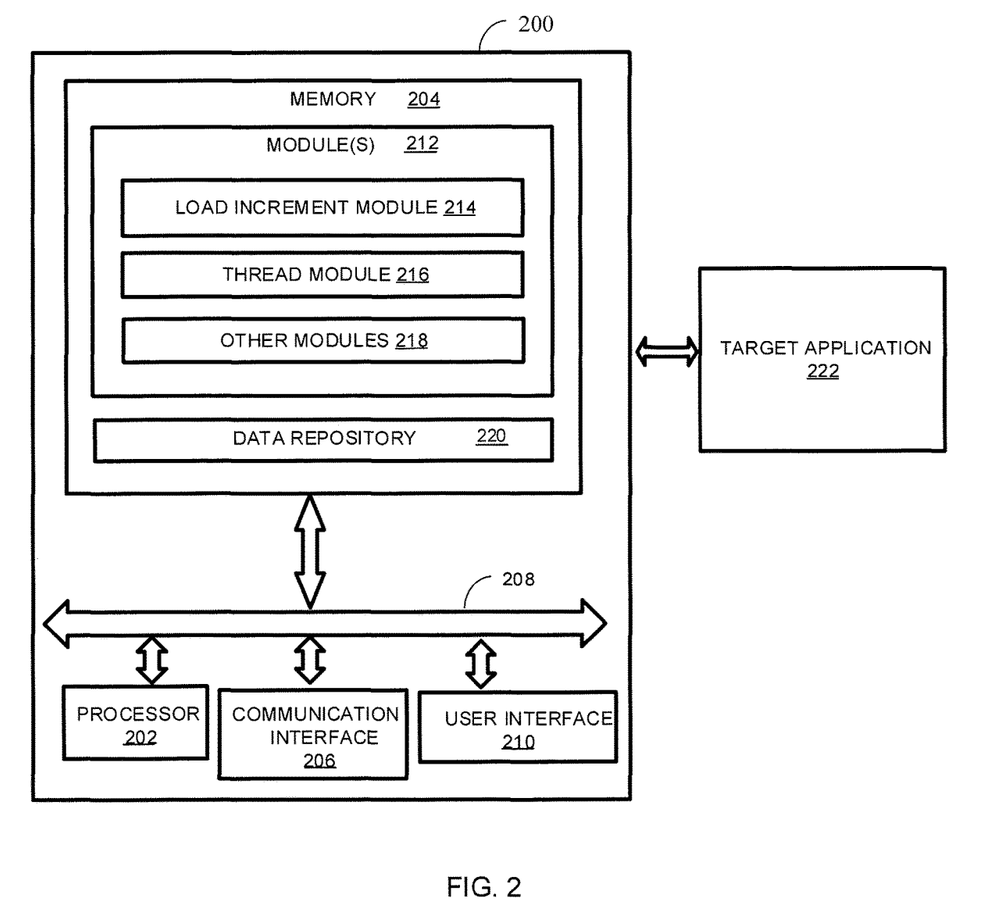
FIG. 2 illustrates a block diagram of a system for dynamic load testing on a target application, according to some embodiments of the present disclosure.

FIG. 2 illustrates a block diagram of a system for dynamic load testing on a target application, according to some embodiments of the present disclosure. The system 200 includes or is otherwise in communication with one or more hardware processors such as a processor 202, at least one memory such as a memory 204, a communication interface 206 and a user interface 210. The processor 202, memory 204, the communication interface 206 and the user interface 210 may be coupled by a system bus such as a system bus 208 or a similar mechanism. Various components of the system 200, along with functionalities thereof are explained below.

In an embodiment, the processor 202 may include circuitry implementing, among others, logic functions associated with the communication. For example, processor 202 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 202 may include, among other things, a clock, an arithmetic logic unit (ALU) and logic gates configured to support operation of the processor 202. Further, the processor 202, may include functionality to execute one or more software programs, which may be stored in the memory 204, or otherwise accessible to the processor 202.

The at least one memory such as a memory 204, may store any number of pieces of information, and data, used by the system to implement the functions of the system 200. The memory 204 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the processor 202 to carry out various functions in accordance with various example embodiments. Additionally or alternatively, the memory 210 may be configured to store instructions which when executed by the processor 208 causes the system 200 to behave in a manner as described in various embodiments.

The memory 204 also includes module(s) 212 and a data repository 220. The module(s) 212 includes, for example, load increment module 214, thread module 216, and other modules(s) 218. The other module(s) 218 may include measuring performance metrics and controlling core load testing activities. The other module(s) 218 may also include programs or coded instructions that supplement applications or functions performed by the dynamic load testing system 200. The data repository 220 may include the plurality of threads. Further, the data repository 220 amongst other things, may serve as a repository for storing data that is processed, received, or generated as a result of the execution of one or more modules in the module(s) 212.

Although the data repository 220 is shown internal to the dynamic load testing system 200, it will be noted that, in alternate embodiments, the data repository 220 can also be implemented external to the dynamic load testing system 200. The data contained within such external database may be periodically updated. For example, new data may be added into the database and/or existing data may be modified and/or non-useful data may be deleted from the database. In one example embodiment, the data may be stored in an external system. In another embodiment, the data stored in the data repository 220 may be distributed between the dynamic load testing system 200 and the external database.

The communication interface 206 is configured to facilitate communication between the network and the system 200. The communication interface 206 may be in form of a wireless connection or a wired connection. Examples of wireless communication interface 206 may include, but are not limited to, IEEE 802.11 (Wifi), BLUETOOTH®, or a wide-area wireless connection. Example of wired communication interface 206 includes, but is not limited to Ethernet.

In an example embodiment, a user interface 210 may be in communication with the processor 202. Examples of the user interface 210 include but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 210 may include, among other devices or elements, any or all of a speaker, a microphone, a display, and a keyboard, touch screen, or the like. For example, the user interface 210 can be utilized to display counters like running threads and waiting threads to the user. Based on the values displayed by the counters and the run time performance also displayed by the user interface, the user may decide the load to be increased for load testing. In a case of an invalid request (e.g. request by user>number of waiting thread count) an appropriate message can be displayed by the user interface 210.

The system 200 is communicably coupled with a target application 222. The target application 222 is an external system which is directly impacted by the activities of the plurality of threads of the system 200. In an embodiment, the target application 222 includes a plurality of applications on which load testing is to be performed by the system 200.

In an embodiment, instructions for dynamic load testing may be in the form of a program or software. The software may be in the form of system software or application software. The system for dynamic load testing, may be facilitated through a computer implemented application available over a network such as the Internet. In an embodiment, for performing the functionalities associated with dynamic load testing system (described with reference to FIGS. 1 to 4E), the memory 204 and the system 200 may include multiple modules or software programs that may be executed by the processor 202.

In an embodiment, the processor receives one or more load increment requests through the load increment module 214. The load increment request is based on the input provided by a user. The load increment request includes a thread increment count which indicates a count of number of waiting threads to be unlocked to increase the load on the target application for the purpose of load testing. Herein, the terms 'unlocking the threads' refers to releasing the threads for performing load testing of the target applications and hence the terms releasing and unlocking of threads can be used interchangeably throughout the description.

The load increment module 214 is an external communication endpoint which initiates the load increment request. The load increment request contains an integer parameter describing the number of waiting threads to be released for testing the target application. For example, the load increment request specified by the user is 6, this indicates that a count of 6 threads need to be released for load testing of the target application.

The thread module 216 includes a plurality of threads and each thread in the plurality of threads is capable of performing a predefined sequence of steps which constitutes a load generation task. For example, the predefined sequence of steps can include launch of the target application url, providing login credentials, click on login button, go to search menu and the like. The plurality of threads in the thread module 216 are segregated into a coordinator thread and waiting threads. The coordinator thread is a thread which is modified to perform coordination and synchronization method called COORDINATE( ) between the load increment module 214 and behavior of the plurality of waiting threads in the load testing environment. The load increment module 214 receives an input from the user and sends the load increment request to the coordinator via a communication socket present in the coordinator thread. The coordinator thread unlocks a number of waiting threads equivalent to the count of load increment request.

Further, the remaining plurality of threads are modified into one or more waiting threads which are in a locked condition. Herein remaining threads refers to those threads of the plurality of threads which are unutilized after the unlocking. Such threads maybe locked for the time being and are capable of being unlocked upon receiving an end-of-wait signal from the coordinator thread. The one or more waiting threads execute a specific processor-implemented method called WAIT( ) followed by the core load generation task wherein the one or more waiting threads are referred as "Running Threads". The one or more waiting threads wait for an end-of-wait signal to get unlocked. The one or more waiting threads can access the target application only when they are unlocked or released. The coordinator thread sends the end-of-wait signal for unlocking the requested number of waiting threads based on the thread increment count. The one or more waiting threads are unlocked after receiving the end-of-wait signal from the coordinator thread and the requested number of waiting threads are converted to one or more running threads. The one or more running threads are able to access the target application. The one or more running threads are executed to test the load on the target application.

In an embodiment, the user can specify the load to be increased on the target application as percentage, multiplicative values or integer numbers. The system calculates the number of threads to be released based on the input provided by the user. For example, the user may specify that the load increment on the target application should be thirty percent. Based on the input of thirty percent the system calculates that 3 threads should be released for load testing.

In the following example embodiment, the process of receiving the load increment request is explained. The system waits for the load increment request. The load increment request is received and the coordinator thread checks for the availability of waiting threads based on the count of load increment request. Based on the availability of waiting threads the system 200 unlocks the requested number of waiting threads for load testing on the target application in the running load testing environment. The coordinator thread utilizes the following steps to calculate the number of waiting threads to be released.

Coordinate

```
INPUTS:   INTEGER              serverPort,
          SYNCHRONIZATION_LOCK lock,
          CONDITION_ON_LOCK    cond,
          INTEGER              waitingThreadCount
STEPS:
  REPEAT FOREVER:
    - KEEP LISTENING TO <serverPort> UNTIL ANY LOAD INCREMENT
      REQUEST ARRIVES
    - IF REQUEST_TYPE == TERMINATE:
        ReleaseWaitingThreads (waitingThreadCount, lock, cond, false);
        BREAK
    - IF REQUEST TYPE == INCREMENT:
        no_of_threads_to_release =
        EXTRACT_THREAD_COUNT_FROM_REQUEST( )
        IF (waitingThreadCount >= no_of_threads_to_relase) {
          ReleaseWaitingThreads (no_of_threads_to_release, lock, cond, true);
          IF THERE IS NO MORE WAITING THREADS;
             BREAK;
        ELSE
          RESPOND ("SUFFICIENT WAITING THREADS NOT AVAILABLE")
END
```

In the following example embodiment, the process of unlocking the waiting threads based on the load increment request is explained. The method ReleaseWaitingThreads unlocks the waiting threads. The unlocking of waiting threads are performed by sending the end-of-wait signal based on the count of load increment request.

Release Waiting Threads

```
INPUTS:   INTEGER              no_of_threads_to_relase,
          SYNCHRONIZATION_LOCK lock,
          CONDITION_ON_LOCK    cond,
          BOOLEAN              loadGenStatus
STEPS:
  WHILE (no_of_threads_to_release !=0):
    - AQUIRE THE SYNCHRONIZATION LOCK lock
    - SET THE ATTRIBUTE REPRSENTING LOADGNERATION STATUS TO
      <loadGenStatus>
    - SIGNAL THE CONDITION cond
    - RELEASE THE LOCK lock
    - DECREMENT no_of_threads_to_release BY 1
END
```

Further, the process of waiting by the remaining number of plurality of threads is explained. The method WAIT is the condition by which the plurality of threads are locked and further wait for the end-of-wait signal from the coordinator thread to get unlocked. The unlocking of waiting threads are performed by sending the end-of-wait signal based on the count of load increment request.

Wait

```
INPUTS:   SYNCHRONIZATION_LOCK  lock,
          CONDITION_ON_LOCK     cond,
STEPS:
          ACQUIRE THE SYNCHRONIZATION LOCK lock
          WAIT FOR CONDITION)ON_LOCK cond
          loadGenIndicator = lock.isLaodGenIndicatorSet ( );
          RELEASE THE LOCK lock
          RETURN LoadGenIndicator;
```

Figure 3:
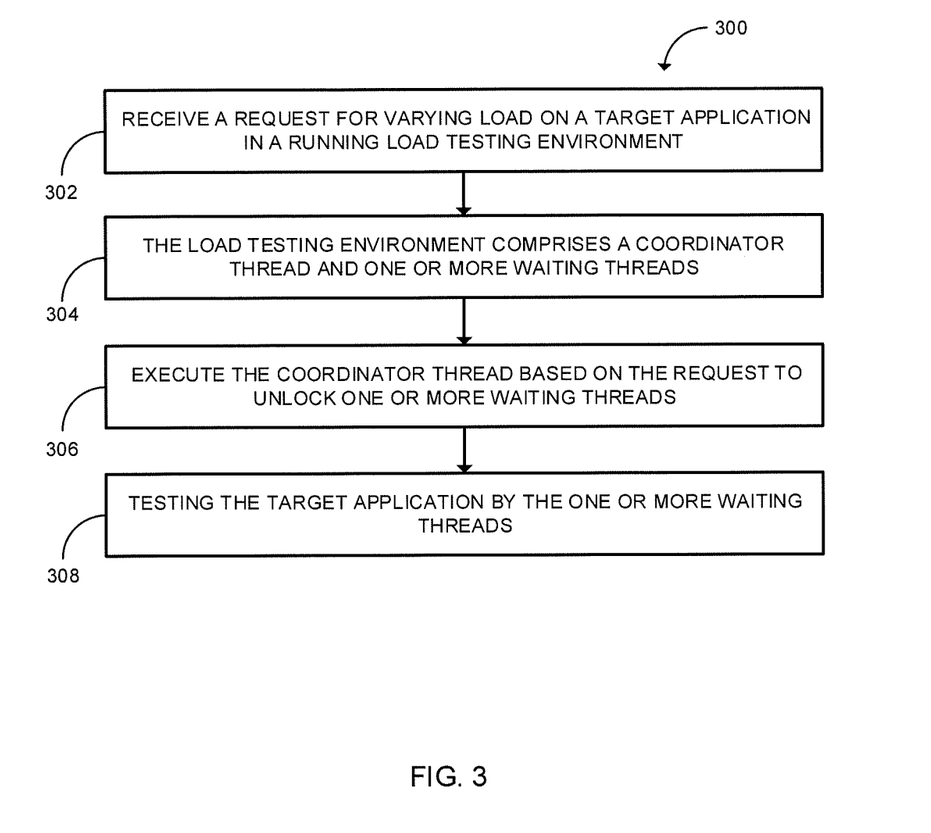
FIG. 3 illustrates a process flow of method for dynamic load testing on a target application, according to some embodiments of the present disclosure.

FIG. 3 illustrates a process flow of method for dynamic load testing, according to some embodiments of the present disclosure. In an embodiment, the method 300 for dynamic load testing can be implemented by a system, for example, the system 200 (FIG. 2). At step 302 of method 300, the load increment requests from a user are received by load increment module as represented in FIG. 2. The load increment request may contain an integer parameter describing the count of number of waiting threads to be released to increase the load on the target application for the purpose of load testing. The dynamic load testing system provides external control to the user to increase the load on the target application in the running load testing environment.

At step 304 of method 300, the load testing environment comprises of a plurality of threads. The plurality of threads include a coordinator thread and one or more waiting threads. The plurality of threads are present in the thread module as represented in FIG. 2 The waiting threads are in a locked condition where only the coordinator thread can unlock a count of waiting threads by sending an end-of-wait signal.

At step 306 of method 300, the coordinator thread present in the thread module unlocks the required number of waiting threads based on the load increment request received. The waiting threads present in the thread module are in the locked condition where they wait for the end-of-wait signal to get unlocked. The coordinator thread after receiving the load increment request from the load increment module sends the end-of-wait signal to unlock the requested number of waiting threads based on the load increment request. The unlocked waiting threads are converted into one or more running threads. For example, the load increment request includes a request for increasing a load of 5, the load increment module sends a signal to the coordinator thread for unlocking a count of 5 threads/loads. Then the coordinator thread sends an end-of-wait signal to 5 waiting threads which are then further converted to running threads for load testing a target application.

At step 308 of method 300, the current running threads access the target application present in the target application module as represented in the FIG. 2. The current running threads on accessing the target application get executed for dynamic load testing of the target application. The process of dynamic load testing is further explained in detail by FIGS. 4A and 4E through an example embodiment.

Figure 4A:
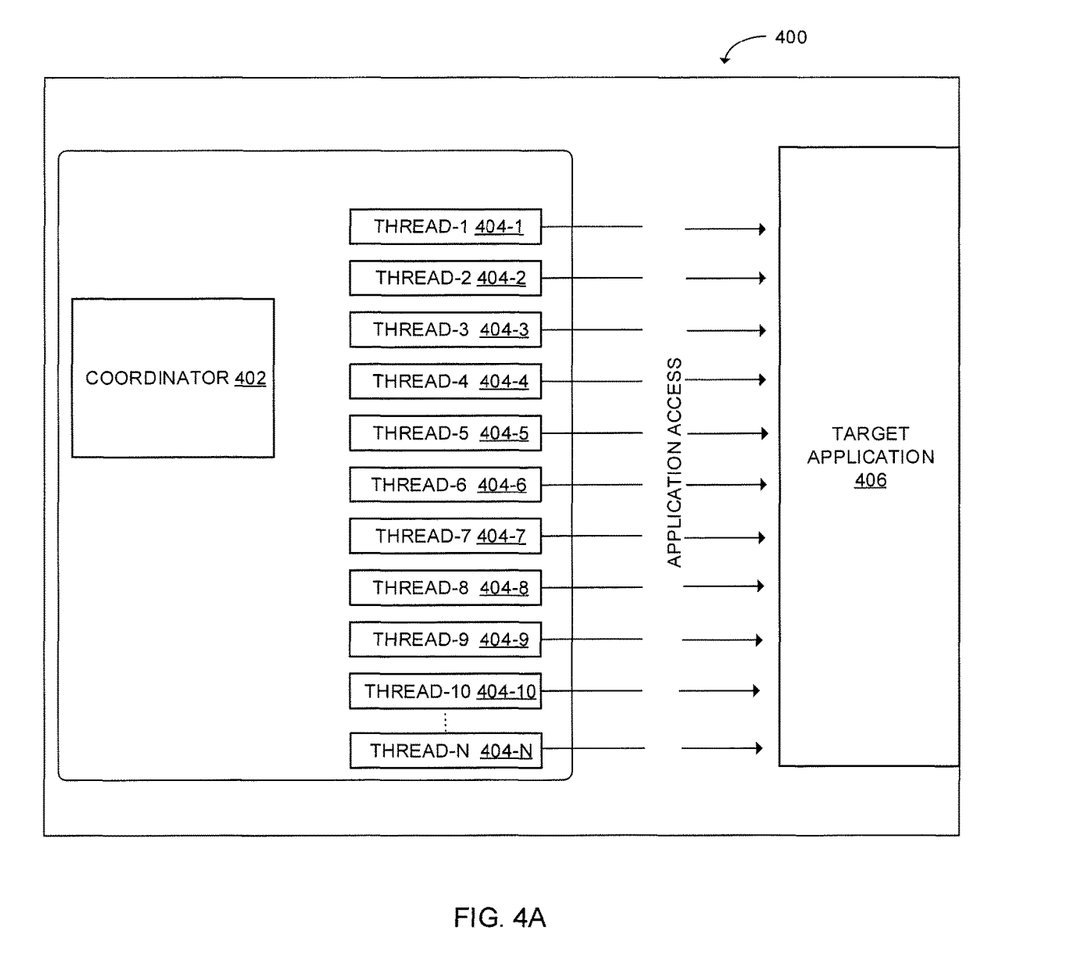
FIGS. 4A, 4B, 4C, 4D and 4E illustrate an example embodiment for dynamic load testing on a target application, according to some embodiments of the present disclosure.

FIGS. 4A to 4E illustrate an example embodiment for dynamic load testing, according to some embodiments of the present disclosure. FIG. 4A illustrates the thread module (216 in FIG. 2) and target application (222 in FIG. 2). The thread module comprises of plurality of threads. The plurality of threads in the thread module include a coordinator thread 402 and the remaining plurality of threads are waiting threads (404-1 to 404-N). The dynamic load testing is performed on the target application 406 by the waiting threads (404-1 to 404-N).

Figure 4B:
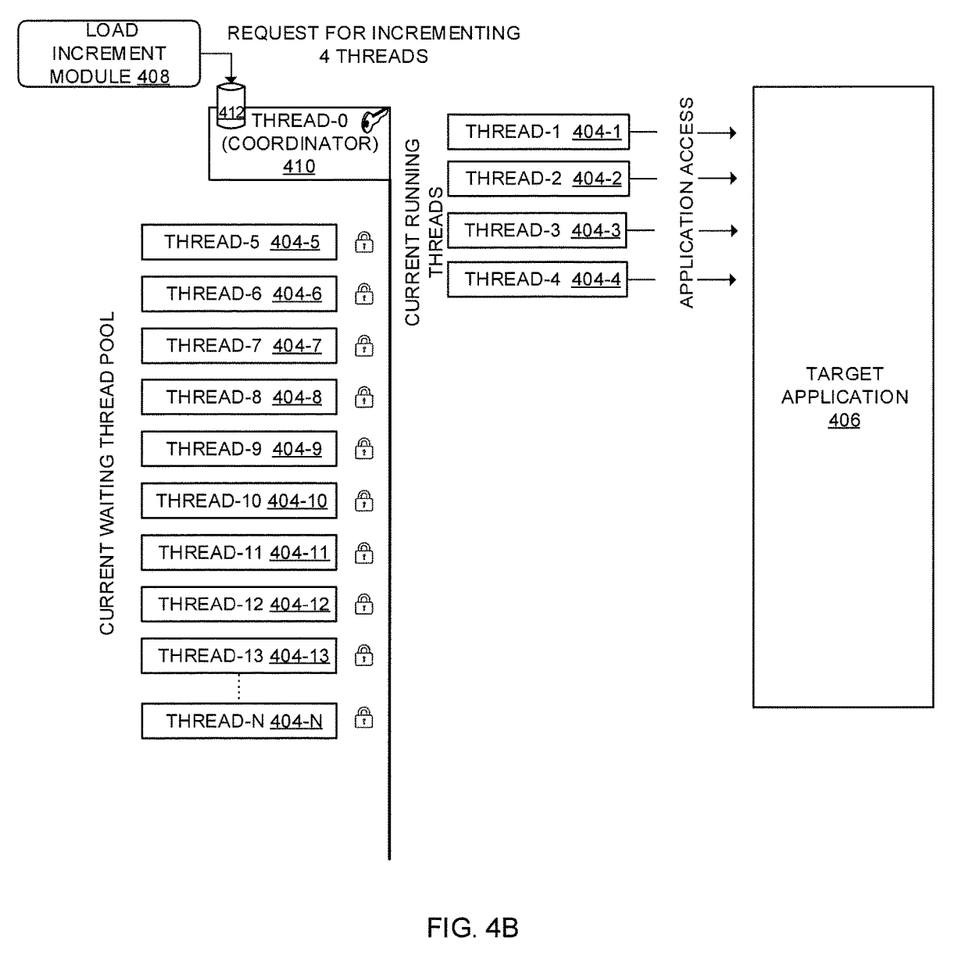

Similarly, FIG. 4B illustrates the example embodiment for sending load increment request in the running load testing environment by the load increment module (214 in FIG. 2) to the coordinator thread 410 via the communication socket 412 present in the coordinator thread. The load increment request is based on the request provided by the user. In the present example embodiment, the load increment module 408 receives a load increment request of a count of 4 for increasing the load on the target application 406. The load increment module sends the load increment request which is count 4 to the coordinator thread 410 via the communication socket 412. The waiting threads (404-5 to 404-N) are in a locked condition and waiting for an end-of-wait signal from the coordinator thread 410 to get unlocked. The threads (404-1 to 404-4) are running threads which are currently accessing the target application 406 for performing load testing.

Figure 4C:
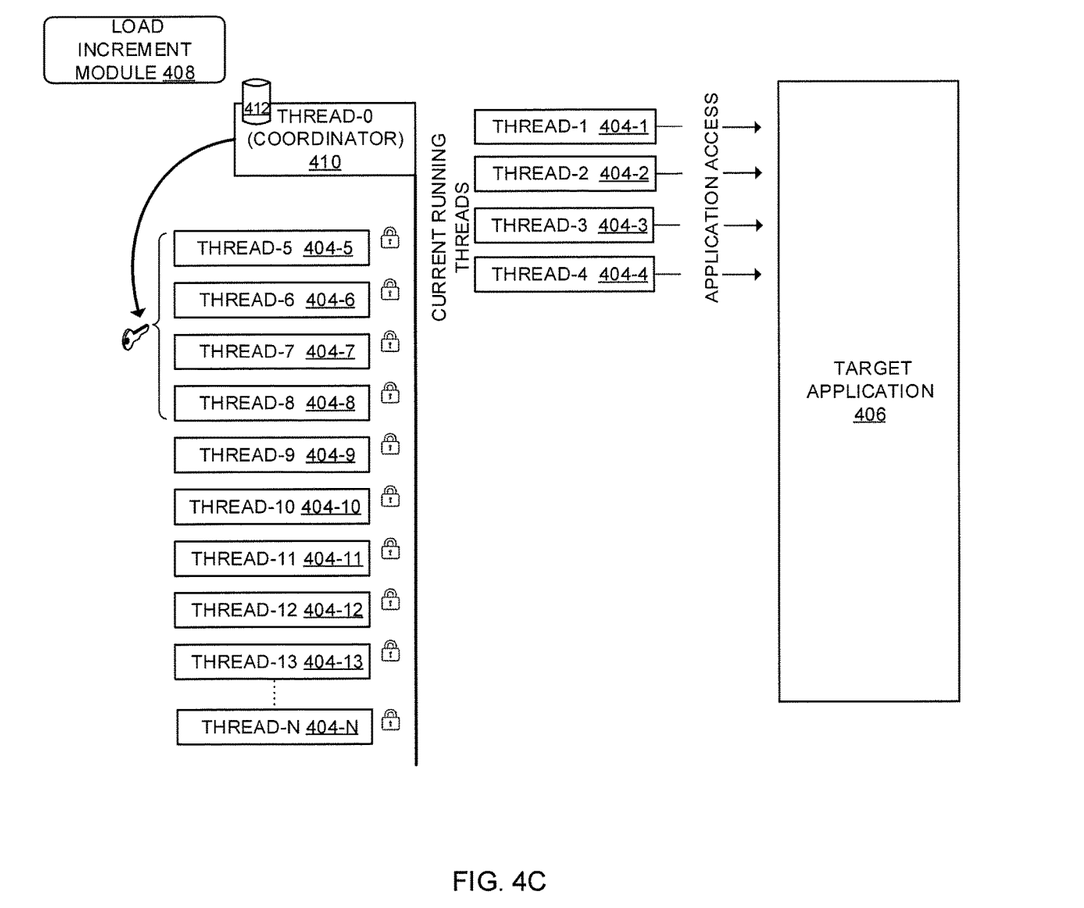

Similarly, FIG. 4C illustrates the unlocking of the waiting threads (404-5 to 404-N). The coordinator thread 410 present in the thread module unlocks the waiting threads (404-5 to 404-8) based on the load increment request. In the present example, 4 waiting threads (404-5 to 404-8) are unlocked. The coordinator thread 410 sends the end-of-wait signal for unlocking the waiting threads (404-5 to 404-8) based on the count of load increment request received by the coordinator thread.

Figure 4D:
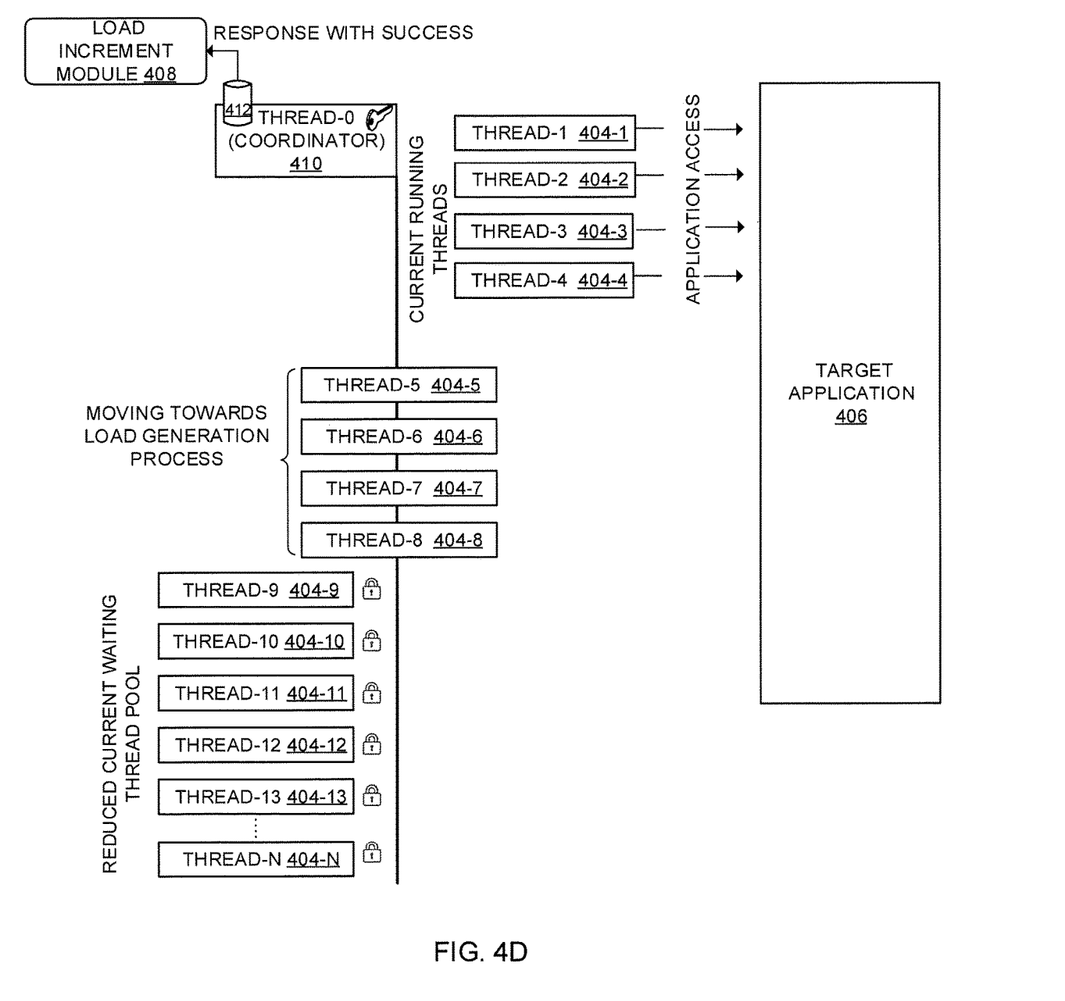

Further, FIG. 4D illustrates the addition of unlocked waiting threads present in the thread module to the current running threads which are the threads (404-1 to 404-4) to access the target application. The waiting threads (404-5 to 404-8) get unlocked by the coordinator thread 410 by an end-of-wait signal. The unlocked waiting threads (404-5 to 404-8) get added to the current running threads present. The increased current running threads (404-1 to 404-8) performing load testing in the load testing environment includes both current running threads (404-1 to 404-4) and unlocked waiting threads (404-5 to 404-8).

Figure 4E:
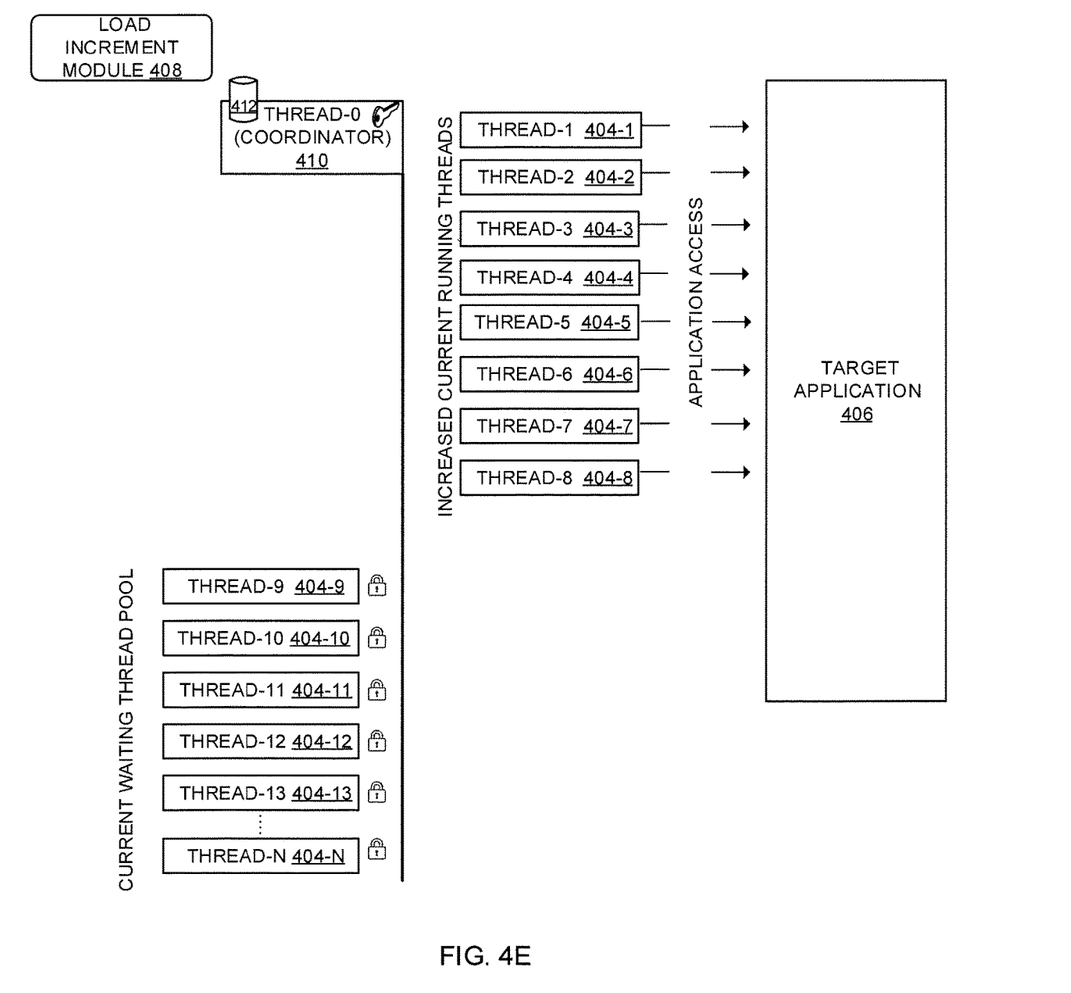

Similarly, FIG. 4E illustrates the access of the target application by the increased current running threads (404-1 to 404-8). The increased current running threads (404-1 to 404-8) access the target application. The increased current running threads are executed in the target application for load testing.

Hence it is clearly illustrated by FIG. 4A to FIG. 4E that the system reduces the overall duration of load testing on the target application as there is no need for the user to wait for load testing to complete before the user can increase the load on the target application. This is done by providing external control to increase the load in the running load testing environment. Finally, this system is flexible enough to be deployed on all the computing devices having different processor types or specifications.

In an implementation, one or more of the method(s) described herein may be implemented at least in part as instructions embodied in non-transitory computer-readable storage medium and executable by one or more computing devices. In general, a processor (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device.

The preceding description has been presented with reference to various embodiments. Persons having ordinary skill in the art and technology to which this application pertains appreciate that alterations and changes in the described structures and methods of operation can be practiced without meaningfully departing from the principle, spirit and scope.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor-implemented method for dynamic load testing on a target application, the method comprising:
   receiving, via one or more hardware processors, a load increment request for varying load on the target application in a load-testing environment at run time, the load-testing environment comprising a plurality of threads to be executed for load-testing,
   wherein the plurality of threads comprises a coordinator thread and one or more waiting threads, the one or more waiting threads are locked from accessing the target application and wherein the coordinator thread is configured to unlock one or more waiting threads, wherein the load increment request contains an integer parameter count of a number of the one or more waiting threads to be unlocked for incrementing the load on the target application;
   executing, via the one or more hardware processors, the coordinator thread, based on the received load increment request, to unlock the one or more waiting threads; and
   testing, via the one or more hardware processors, the load on the target application by one or more unlocked waiting threads to facilitate in providing external control for incrementing the load on the target application.

2. The method of claim 1, wherein executing the coordinator thread to unlock the one or more waiting threads comprises:
   acquiring one or more conditions to unlock the one or more waiting threads, based on the received load increment request; and
   signaling the one or more conditions to unlock the one or more waiting threads based on the number of conditions acquired.

3. A system for dynamic load testing on a target application, the system comprising:
   a processor; and
   a memory coupled to the processor, and storing processor-executable instructions comprising instructions to:
      receive a load increment request for varying load on a target application in a load-testing environment at run time, the load-testing environment comprising a plurality of threads to be executed for load-testing,
      wherein the plurality of threads comprises a coordinator thread and one or more waiting threads, the one or more waiting threads are locked from accessing the target application and wherein the coordinator thread is configured to unlock one or more waiting threads, wherein the load increment request contains an integer parameter count of a number of the one or more waiting threads to be unlocked for incrementing the load on the target application;
      execute the coordinator thread, based on the load increment request, to unlock the one or more waiting threads; and
      test the load on the target application by one or more unlocked waiting threads to facilitate in providing external control for incrementing the load on the target application.

4. The system of claim 3, wherein executing the coordinator thread to unlock the one or more waiting threads comprises:
   acquire one or more conditions to unlock the one or more waiting threads, based on the received load increment request; and
   signal the one or more conditions to unlock the one or more waiting threads based on the number of conditions acquired.

5. A non-transitory computer readable medium with a computer program product embodied thereon, the computer program product comprising computer instructions for:
   receiving a load increment request for varying load on a target application in a load-testing environment at run time, the load-testing environment comprising a plurality of threads to be executed for load-testing,
   wherein the plurality of threads comprises a coordinator thread and one or more waiting threads, the one or more waiting threads are locked from accessing the target application and wherein the coordinator thread is configured to unlock one or more waiting threads, wherein the load increment request contains an integer parameter count of a number of the one or more waiting threads to be unlocked for incrementing the load on the target application;
   executing the coordinator thread, based on the received load increment request, to unlock the one or more waiting threads; and
   testing the load on the target application by one or more unlocked waiting threads to facilitate in providing external control for incrementing the load on the target application.

6. The non-transitory computer readable medium of claim 5, wherein the computer instructions for executing the coordinator thread comprises:
   acquiring one or more conditions to unlock the one or more waiting threads, based on the received load increment request; and
   signaling the one or more conditions to unlock the one or more waiting threads based on the number of conditions acquired.

* * * * *